E. F. REID.
APPARATUS FOR IRRIGATING PLANTS.
APPLICATION FILED JUNE 8, 1918.
1,278,217.
Patented Sept. 10, 1918.
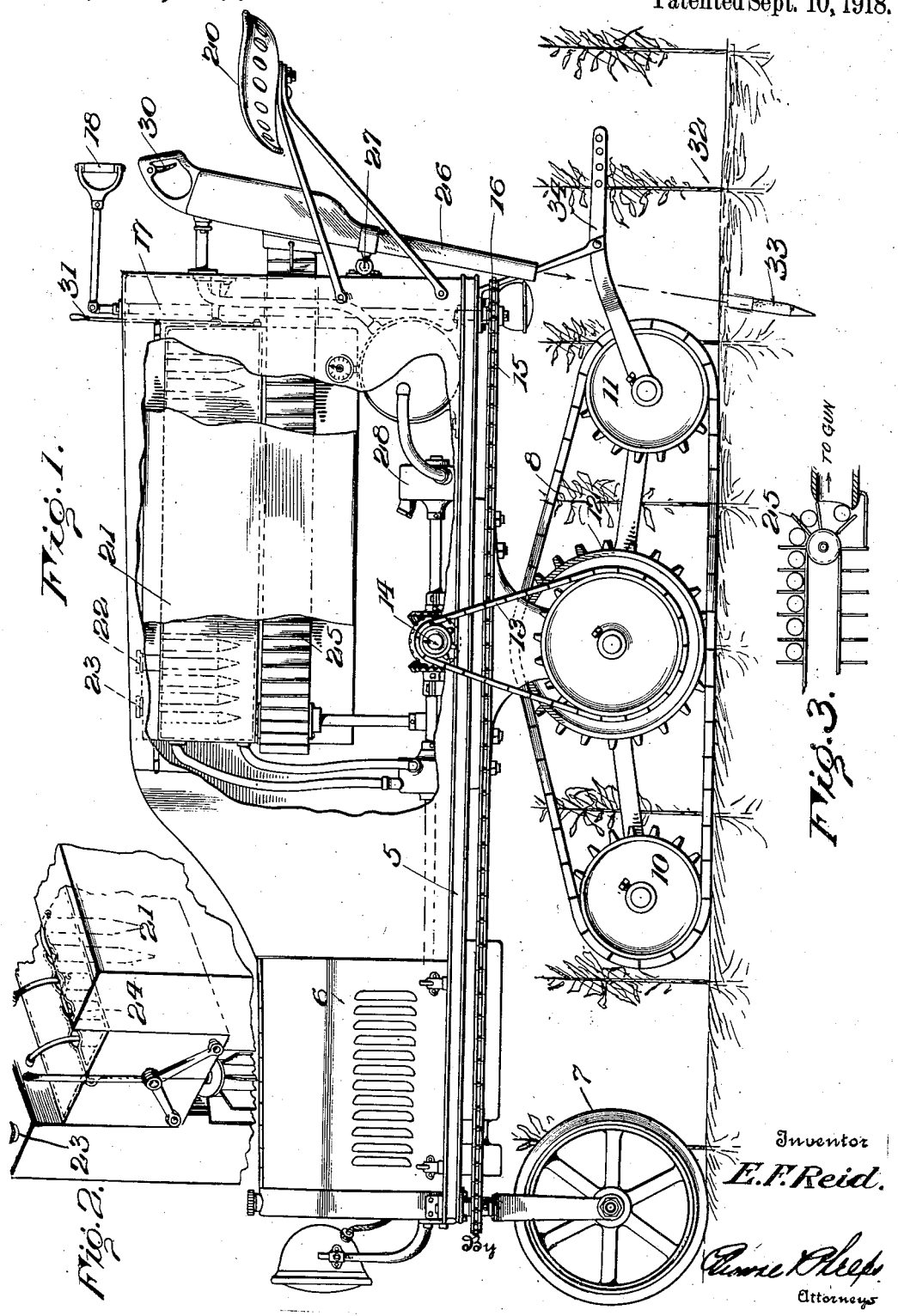
Inventor
E. F. Reid.
Attorneys

UNITED STATES PATENT OFFICE.

ELTON F. REID, OF WACO, TEXAS.

APPARATUS FOR IRRIGATING PLANTS.

1,278,217.  Specification of Letters Patent.  Patented Sept. 10, 1918.

Application filed June 8, 1918. Serial No. 238,863.

*To all whom it may concern:*

Be it known that I, ELTON F. REID, a citizen of the United States, residing at Waco, in the county of McLennan and State of Texas, have invented certain new and useful Improvements in Apparatus for Irrigating Plants, of which the following is a specification.

This invention relates to irrigating apparatus and more particularly to an apparatus especially adapted for irrigating growing trees and plants of all kinds in climates where surface irrigation, due to extremely high temperatures and dry atmospheres, is impracticable for obtaining the best results.

One of the objects of the present invention is to provide a simple and practical apparatus particularly adapted for irrigating young growing plants. A further object is to provide a portable self-contained apparatus of the above character having relatively few parts which may be inexpensively made, assembled and operated. A further object is to provide an apparatus of the first above mentioned character which will be reliable and efficient in use and operation. A further object is to provide an apparatus of the above character capable of most efficiently and practically irrigating plants at their roots where the effect of the irrigation will be most effective.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings like characters of reference denote corresponding parts throughout all the views, in which Figure 1 is a side elevation partly in section showing largely diagrammatically the complete apparatus;

Figs. 2 and 3 are detail views.

Referring now to the drawings in detail and more particularly to Fig. 1, 5 denotes the floor of the body portion of a vehicle of any desired type, but as herein shown, the apparatus comprises a self-contained automobile, preferably of tractor form, having an engine indicated at 6, one or more steering wheels 7 at the forward part, and a tractor chain 8 in the rear. This chain is adapted to travel about sprockets 10 and 11 and is driven by a central sprocket 12 which in turn is rotated by means of chain 13 operated from a main transverse drive shaft 14. This, of course, is connected in any desired manner with the main engine 6 and includes suitable transmission, change speed, and engine control as may be necessary. The front or steering wheels 7 are connected in any suitable manner as by means of rope or linkage 15 to a rear wheel or member 16 at the bottom of shaft 17 the upper end of which shaft is provided with a steering handle 18. The driver's or operator's seat 20 is conveniently located at the rear of the machine, as indicated.

Mounted in the upper rear part of the body of the vehicle is a two part chamber 21, as shown in Fig. 2, adapted to hold or contain a freezing mixture such as a brine or gas of any desired type and if of that character requiring compression a pump is preferably provided driven from or adapted to be connected with the main source of power 6 as may be necessary. As the particular type of refrigerant and method of use forms no special part of the invention, details of such apparatus are for clearness omitted, it being sufficient to indicate an inlet 22 to this tank.

Adjacent this tank 21, either above or surrounding it as may be desired for insulating purposes, is a second tank, having an inlet 23, for supplying water at intervals to a series of split molds 24 operatively associated with the refrigerant tank. Fertilizer may be mixed with the water if desired. These molds are of general cylindrical shape having pointed ends and after the water has been frozen therein they may be separated along longitudinal lines, as indicated for example in Fig. 2, to discharge the pellet or projectile of ice into an endless conveyer belt 25 positioned beneath and between the two parts of the tank 21. This conveyer belt is adapted to convey the ice projectiles to a gun or discharging device 26 mounted in pivotal bearings 27 whereby its direction may be varied at will. More than one gun may be used if desired. This gun is preferably discharged by compressed air obtained from air pump shown diagrammatically at 28 and connected in any desired manner with the main source of motive supply 6. A trigger 30 is associated with the gun for actuating it as desired while a second trigger 31 is positioned convenient to the operator for actuating the endless belt 25 in a step by step manner to feed the projectiles to the gun 26.

As shown in Fig. 1, plants are indicated at 32 and the gun is shown as discharging a projectile 33 into the ground adjacent the roots of the plants. In this manner the ice is protected from the direct rays of the sun as well as the dry atmosphere by the layer of dirt thereover and will slowly melt, allowing the roots of the plants to absorb the full extent of moisture. If desired, an attachment 34 may be connected with the rear of the machine for covering over the hole in the ground made by the entering projectile thereby to more efficiently conserve the moisture.

In operation, the machine travels along between or straddling the rows of plants under its own power and as the plants are reached the gun 26 is fired to discharge a projectile of ice into the ground at the roots of the plant, as shown. The apparatus is of such size as to provide twenty or thirty projectiles at once to the endless belt 25 and while these are being used, a second charge will have been made by the refrigerant in the freezing tank. When not used for the above purpose the apparatus may be used wherever a tractor is applicable.

From the above it will be seen that the present device provides a simple and practical apparatus adapted to accomplish, among others, all of the objects and advantages herein set forth.

I realize that considerable variation is possible in the details of construction and arrangement of parts without departing from the spirit of my invention, and I therefore do not intend to limit myself to the specific form shown and described.

I claim—

1. In an apparatus of the character described, in combination, a vehicle having refrigerating means for forming ice pellets, and means adapted to discharge said pellets into the ground for irrigating plants at their roots.

2. In an apparatus of the character described, in combination, a motor vehicle, a refrigerating means carried thereby adapted to make ice pellets, a gun carried by said vehicle for discharging the ice pellets into the ground at the roots of plants, and means for conveying the ice pellets from the refrigerating means to the gun.

3. In an apparatus of the character described, in combination, a motor vehicle, a refrigerating means carried thereby adapted to make ice pellets, a gun carried by said vehicle for discharging the ice pellets into the ground at the roots of plants, means for conveying the ice pellets from the refrigerating means to the gun, said gun being operated by compressed air, and means actuated by the engine of the motor vehicle for supplying compressed air to the gun.

4. In an apparatus of the character described, in combination, a refrigerating means adapted to form ice pellets, a conveyer into which said ice pellets are periodically discharged, a gun carried by the vehicle adapted to shoot the ice pellets into the ground adjacent the roots of plants, and means for operating said conveyer in a step by step manner.

5. In a motor vehicle having its own source of power, refrigerating means for forming ice pellets, a gun for discharging the ice pellets into the ground adjacent the roots of plants, an air pump driven from the source of power for supplying compressed air to the gun, a conveyer for carrying the ice pellets from the refrigerating means to the gun, and means for actuating said conveyer.

In testimony whereof I affix my signature in the presence of two witnesses.

ELTON F. REID.

Witnesses:
  D. W. GALL,
  K. E. KLEIN.